United States Patent Office 3,041,192
Patented June 26, 1962

3,041,192
CONDITIONING OF PHTHALOCYANINE
PIGMENTS
Robert E. Brouillard, Westfield, James Gannon, Florham Park, and Leon Katz, Springfield, N.J., assignors to General Aniline & Film Corporation, New York, N.Y., a corporation of Delaware
No Drawing. Filed Nov. 16, 1959, Ser. No. 853,011
24 Claims. (Cl. 106—308)

This invention relates to a process for the conditioning of highly halogenated copper phthalocyanine containing 12 to 16 halogen atoms per molecule, to yield a pigment product preeminently suitable for particular end use applications.

Halogenated copper phthalocyanine may be obtained by a number of methods. These methods includes halogenation of copper phthalocyanine in a liquid diluent under pressure of halogenation at atmospheric pressure in a solvent such as a eutectic mixture of aluminum chloride and sodium chloride. The latter method is preferable because the starting material and the product show appreciable solubility in the medium, halogenation being thereby facilitated and making possible the production of pigments containing more nearly the theoretically possible halogen content of 16 halogen atoms per molecule.

When a liquid diluent is used in the halogen the product is usually isolated by steaming to remove the diluent after which the resulting aqueous slurry is filtered and the pigment dried. The use of a eutectic mixture of aluminum chloride and sodium chloride calls for isolation by dilution with water followed by filtration and drying.

The pigments obtained in the above-described manner have exceedingly poor color value. Thus, when they are ground on a Hoover Muller or a three roller ink mill with an appropriate vehicle such as lithographic varnish, they are dull and show only 20–30% of the color value obtained from commercial standards. If one evaluates the pigments before drying by flushing into an oil vehicle, similarly inferior characteristics are obtained. Because of these conditions halogenated copper phthalocyanine in its initial stage of manufacture, as described above, is known in the art as the "Base," which must be further conditioned.

Various methods have been developed for conditioning the crude base so that it will develop maximum brilliance and strength, substantially all of which are of the acid pasting type. In practice, such acid pasting has in the past been substantially limited to two general methods. The first method involves solution of the pigment in a mixture of sulfuric acid monohydrate and chlorosulfonic acid followed by drowning the acid solution in water. The second method involves slurrying the pigment in a large volume of sulfuric acid of a concentration insufficient to effect appreciable solution followed by precipitation by drowning in water. Both of these methods require careful control of operating conditions to get reproducible results.

These acid pasting processes are expensive and time consuming and suffer from disadvantages in that they require large quantities of acids which are generally of an extremely corrosive nature. In addition to this unfavorable economic factor, the use of such volumes of acid poses problems in industrial hygiene and safety, as well as an extremely serious and costly disposal problem.

It is an object of the instant invention to provide a process for conditioning crude highly halogenated copper phthalocyanine which will not be subject to the above disadvantages. Another object of the instant invention is the provision of a process for conditioning such crude material which avoids the necessity of using large amounts of acids. A further object of the instant invention is the provision of a process for the production of a highly halogenated copper phthalocyanine having improved particle characteristics and particularly adapted for use in the pigmentation of plastics. Other objects and advantages will appear as the description proceeds.

The attainment of the above objects is made possible by the instant invention which comprises a process for conditioning polyhalogenated copper phthalocyanine pigment containing 12 to 16 halogen atoms per molecule comprising admixing the halogenation mass in which said pigment is produced with an aqueous medium in the presence of at least about 5%, based on the weight of said pigment, of a water immiscible monomeric organic ester of a poly-basic acid, said ester having a boiling point of at least about 150° C. It has been found that the process of this invention not only avoids the necessity for the usual acid pasting conditioning step, with its many disadvantages, but in addition produces a pigment composition having excellent color value and the like when employed for the coloration of non-aqueous plastic compositions, particularly floor tiles and linoleum.

The resulting pigment composition is in the form of particles having optimum particle characteristics, coated with the defined organic ester. Depending upon the particular ester employed, the pigment product may be readily employed for the pigmentation of compatible plastic compositions, including those having a basis of synthetic organic polymeric materials such as coumarone-indene resins, cellulose derivatives, including cellulose acetate, cellulose acetate butyrate, cellulose nitrate and ethyl cellulose, polymethyl methacrylate, polystyrene, vinyl resins, such as polyvinyl acetate, polyvinyl butyral, polyvinyl chloride, and copolymers of vinyl chloride and vinyl acetate, and alkyd resins and the like.

The monomeric organic esters operative in the instant invention should be liquid under the conditions prevailing during the admixture of the halogenation mass with the aqueous medium or during subsequent removal of the water, and should have a boiling point of at least about 150° C. (under atmospheric conditions) to prevent their being driven off during the removal of the water and/or volatile organic liquid diluent in the admixture by heating, steam or vacuum distillation, or during drying, and the like. In general, the operative esters employed herein will be found to have a molecular weight ranging from about 175 to 450. In addition to liquidity and non-volatility, such esters must be water immiscible in order to form a hydrophobic film on the pigment particles in the presence of the aqueous medium. The polybasic acid from which the ester is formed may be inorganic, such as phosphoric acid, or organic aliphatic or aromatic. As representative of such organic polybasic acids there may be mentioned aliphatic, polybasic acids such as adipic, azelaic, citric, sebacic, succinic, and tartaric, and aromatic polybasic acids, especially phthalic acids. The hydroxylic esterifying radical may be alkyl of from 1 to 12 carbon atoms or more, cycloalkyl, aralkyl such as benzyl, heterocyclic, or aryl such as phenyl, cresyl, xenyl, or the like, or mixtures thereof. These radicals may contain inert substituents such as lower alkyl, e.g. methyl, ethyl and the like, lower alkoxy, e.g. methoxy, ethoxy and the like, chloro and lower acyl such as acetyl and the like.

As representative of monomeric organic esters operative herein there may be mentioned dibutyl adipate, didecyl adipate, di(methylcyclohexyl) adipate, dibutoxyethyl adipate, dibenzyl adipate, ditetrahydrofurfuryl adipate, diisooctyl azelate, acetyl trihexyl citrate, tri-n-butyl citrate, tri-(2-ethylhexyl) phosphate, triphenyl phosphate, tri-dimethylphenyl phosphate, tricresyl-phosphate, cresyl diphenyl phosphate, diphenyl mono-o-xenyl phosphate, dibutyl butylphosphonate, O,O,O-tributyl phosphorothioate, tri-(2-chloroethyl)-phosphite, dimethyl sebacate, dioctyl sebacate, dibutoxyethyl sebacate, dibutyl succinate, dibutyl tartrate, and mixtures thereof and the like.

However, the organic esters specially preferred herein are the phthalates, which have been found to yield optimum results with respect to maximum color value, compatibility with the plastic, character of the resulting coated pigment composition, and the like. As representative of such preferred esters, there may be mentioned dimethyl phthalate, diisooctyl phthalate, diisodecyl phthalate, butyl isodecyl phthalate, dicapryl phthalate, di-(2-ethylhexyl) phthalate, di-(2-ethylhexyl) hexahydrophthalate, butyl cyclohexyl phthalate, dicyclohexyl phthalate, di-(methylcyclohexyl) phthalate, diphenyl phthalate, dibutoxyethyl phthalate, butyl benzyl phthalate, and mixtures thereof and the like. Of these phthalates, butyl benzyl phthalate is especially preferred because of its optimum properties with respect to stability, boiling point, compatibility with the plastic, and the like.

The organic esters of the instant invention should be present in proportions of at least about 5% based on the weight of the polyhalogenated copper phthalocyanine pigment, the proportions employed in any particular instance depending upon the type of product desired. Thus, where a paste is desired, about 5 to 60% of the organic ester is employed, and higher proportions ranging up to 200% by weight of the pigment are employed when a liquid product is desired. Lower proportions within the above range are generally employed when a dry powder is desired. It is also possible to convert a paste prepared by the instant process to a powder by incorporating therein a finely divided inert solid having high oil absorption such as calcium silicate, magnesium silicate, or finely divided chalk. The proportions of inert solid employed in any particular instance will depend upon the amount of excess organic ester present in the paste being treated, generally ranging from about 1 to 4 parts inert solid per part of organic ester. Pastes and liquid slurries produced by the instant invention may be marketed as such or further roller milled or otherwise worked to improve dispersion, depending upon the end use.

The halogenation of copper phthalocyanine in a volatile organic liquid diluent to produce a product containing 13 to 16 halogen atoms is well known, and no claim is made thereto per se. In general, the inert liquid diluent may be trichlorobenzene, nitrobenzene, o-dinitrobenzene, o-chlorobenzene, carbon tetrachloride, chloroform, acetonitrile, propionitrile, or mixtures thereof or the like. The resulting polyhalogenated copper phthalocyanine pigment is insoluble in the halogenation mass and may be recovered by driving off the volatile liquid diluent by steam distillation, thus being present during the formation of the resulting aqueous slurry. The resulting pigment particles coated with organic ester are then separated from the water by decantation and/or filtration, followed if desired by drying. Instead of depending upon the water of condensation in the steam distillation to produce the aqueous medium necessary in the instant process, water may be added to the halogenation mass prior to steam distillation. In this case, the organic ester may be added to the halogenation mass before or after addition of the water, with good agitation, or it may be intimately admixed and/or emulsified with the water of dilution before addition at this point. If desired, the halogenation mass may be filtered to remove most of the volatile liquid diluent prior to admixture with the aqueous medium in the presence of the organic ester as required in the instant process.

The method of polyhalogenating copper phthalocyanine in a melt of aluminum chloride and sodium chloride is likewise well known in the art and is fully disclosed in U.S. Patents 2,276,860, and 2,247,752. In this melt, the ratio of sodium chloride to aluminum chloride is preferably about 1:4, this being the eutectic ratio of the two components giving the lowest fusion point. In actual practice, this ratio may be varied within wide limits, even to the point of using no sodium chloride at all or replacing part of the sodium chloride by potassium chloride, magnesium chloride, antimony chloride, or the like. All of these modifications are disclosed in U.S. Patent 2,247,752 and it is to be understood that such modifications are to be regarded as equivalent to the eutectic melt of aluminum chloride and sodium chloride referred to herein in the interests of simplicity and expediency. In this process, the polyhalogenated copper phthalocyanine product containing 12 to 16 halogen atoms per molecule is soluble in the melt and is recovered by drowning the halogenation mass in water, desirably acidified, as by addition of 2 to 5% of HCl to a pH of about 1. In accordance with the process of this invention, the organic ester may be added to the halogenation mass prior to drowning, but in the preferred manner, the ester is added to the water prior to drowning. Preferably, the organic ester is in emulsified form in the drowning water, if necessary with the aid of an emulsifying agent (preferably acid stable in view of the acid nature of the drowning water), since presence of the organic ester in the water in unemulsified form normally requires larger amounts to give equally satisfactory results. The coated pigment particles in the resulting aqueous slurry may then be separated by filtering, washing substantially acid-free and drying, or by washing by repeated decantation and separation of the organic layer.

Less desirably, the procedure of this invention as described in the foregoing paragraph may also be applied to other halogenation masses in which the polyhalogenated copper phthalocyanine is soluble. Thus, the halogenation mass may have been produced by halogenation of the phthalocyanine pigment in chlorosulfonic acid, p-toluene sulfonic acid, sulfuryl chloride, or in sulfur monochloride in an autoclave. In such cases, the drowning water is preferably made alkaline, and an alkali stable emulsifying agent is employed for emulsification of the organic ester therein.

The particular emulsifying agent to be employed in carrying out the process of this invention should be effective for producing oil-in-water emulsions and its selection will be a matter of choice obvious to the worker skilled in the art. Although anionic and cationic surface active agents may be used, it is preferred to make use of the well known nonionic surface active agents containing a polyoxyalkylene, preferably polyoxyethylene chain, as derived for example by reaction of a water-insoluble organic compound of at least 6 carbon atoms containing at least one reactive hydrogen atom with a polyalkylene glycol or a plurality of moles of alkylene glycol, halohydrin or alkylene oxide, preferably ethylene oxide. As representative of reactive hydrogen-containing compounds, there may be mentioned carboxylic and sulfonic acids and amides, alcohols, thiols, phenols, amines, and the like, such as stearic acid, castor oil, abietic acid, the corresponding amides, lauryl alcohol, Oxo tridecyl alcohol, dodecyl mercaptan, nonyl phenol, octadecyl amine, rosin amine, and the like. The production of these and similar agents is disclosed in U.S. 1,970,578, 2,205,021, 2,085,706, 2,002,613, 2,266,141, 2,677,700, 2,213,477, and 2,593,112. They may be represented by the general formula

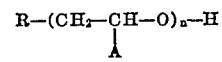

wherein R is the residue of an organic compound containing at least 6 carbon atoms and a reactive hydrogen atom; A is hydrogen, methyl or ethyl; and $n$ has a value of from about 2 to 100.

As pointed out above, an inert finely divided solid diluent may be admixed with the non-aqueous paste or liquid immediately prior to drying to produce a free-flowing powder. A further advantage of the instant invention resides in the ability of these products to be dried at elevated temperatures ranging up to 130 to 150° C. without aggregation or an agglomeration, as distinguished from the previous practice requiring drying temperatures of about 60 to 70° C.

The process of this invention is suitable for the conditioning of any copper phthalocyanine pigment produced in the above manner containing a total of 12–16 chlorine and/or bromine atoms. Thus, such pigment to be treated in accordance with this invention may contain 12 to 16 chlorine atoms, 12 to 16 bromine atoms, or both bromine and chlorine atoms totaling 12 to 16 such halogen atoms. The above described halogenation processes are suitable for use in the production of any such polyhalogenated copper phthalocyanines. The mixed brominated-chlorinated copper phthalocyanines may be readily prepared by sequential addition of gaseous bromine and gaseous chlorine in amounts sufficient to yield the desired degree of bromine and chlorine substitution.

Yellowness has always been a desirable and elusive quality in the polychlorinated copper phthalocyanine green pigments of commerce while on the other hand, a bluer shade of green has presented no problem. This is because a bluer shade of green is easy to obtain by reducing the degree of chlorination or by blending a fully chlorinated copper phthalocyanine green with the unsubstituted copper phthalocyanine blue. Attempts to force the conventional polychlorinated copper phthalocyanine green to a yellower shade by blending with other pigments and/or known conditioning methods almost invariably cause a loss of brightness and color strength or tinting power. A notable step has recently been taken towards producing a yellow shade of copper phthalocyanine green by substituting one or more of the chlorine atoms in the pigment with one or more bromine atoms. Such brominated-chlorinated copper phthalocyanine greens containing a total of at least 12 bromine and chlorine atoms at least one and up to 12 of which are bromine atoms, have been surprisingly found to have a highly desirable yellow shade of green. In such brominated-chlorinated copper phthalocyanines, the degree of yellowness varies directly with the degree of bromine substitution, but with a corresponding decrease in brightness and color strength or tinting power (though not as great a decrease as has been met with in previous attempts to inject yellowness into the commercial copper phthalocyanine greens).

The process of this invention has been found to yield surprising shifts of the green shade of polychlorinated copper phthalocyanine pigments containing for example 14–16 chlorine atoms, to the yellow side. In addition, the present process, when employed for conditioning brominated-chlorinated copper phthalocyanine greens, has been found to yield a surprising relative increase in the brightness and/or color strength or tinting power of such pigments even with an increasing degree of bromine substitution.

The following examples are illustrative of the instant invention and are not to be regarded as limitative. All parts and proportions referred to herein and in the appended claims are by weight unless otherwise indicated.

*Example 1*

A mixture containing 450 parts of anhydrous aluminum chloride, 110 parts of sodium chloride, 20 parts of cupric chloride, and 60 parts of copper phthalocyanine (ground to 60 mesh) is heated on an oil bath to 200° C. Dry chlorine gas is passed into the melt at a vigorous rate for one hour and 20 minutes, whereby a phthalocyanine green base is obtained containing 15 to 16 atoms of chlorine per molecule. The chlorination mass is then poured slowly into 2000 parts of vigorously agitated water containing 25 parts of butyl benzyl phthalate. The aqueous slurry which results is filtered and the filter cake washed acid-free and dried at about 140 to 150° C. The pigment powder thus obtained is stronger, yellower and brighter than the acid pasted commercial standard for phthalocyanine green when evaluated in asphalt and vinyl floor tiles. When compared to the product obtained by the above described process but without butyl benzyl phthalate, the product is two and one half times as strong and much yellower and brighter.

*Example 2*

The process of Example 1 is repeated except that instead of 25 parts of butyl benzyl phthalate, 15 parts are employed emulsified into the drowning water with the aid of 0.5 part of an emulsifying agent (reaction product of castor oil with about 40 moles of ethylene oxide). The results obtained are similar to those of Example 1. Similar results are obtained when the process of this example is repeated but using respectively, dibutyl phthalate and dicapryl phthalate instead of butyl benzyl phthalate.

*Example 3*

The process of Example 1 is repeated except that instead of 25 parts of butyl benzyl phthalate, there is employed 30 parts of dimethyl phthalate. During drying, 50 parts of finely divided calcium carbonate are intimately mixed with the coated pigment. A product is obtained which when ground to a fine powder, can be incorporated into a cellulose acetate base plastic to give results superior to those obtained with the acid pasted commercial standard for phthalocyanine green.

*Example 4*

The process of Example 1 is repeated except that instead of 25 parts of butyl benzyl phthalate, 85 parts of dioctyl phthalate are employed. The aqueous slurry obtained is washed with water by repeated decantation and the organic layer transferred to a Werner-Pfleiderer dough mixer. Mechanical work, heat and vacuum are applied to dry the product and improve dispersion. When incorporated into various plastics, the pigment product so produced gives excellent strength and brilliance.

*Example 5*

Two parts of copper phthalocyanine, 0.1 part of antimony trisulfide and 6 parts of carbon tetrachloride are charged into an autoclave. The temperature is raised to 130° C. and chlorine addition begun through a sparger. The temperature is allowed to rise to 170 to 180° C. When consumption of chlorine ceases and sampling of the chlorination charge shows a product containing 13 to 16 atoms of chlorine per phthalocyanine molecule, the charge is drowned into 50 parts of 80° C. water containing 0.5 part of dicapryl phthalate emulsified therein with the aid of the reaction product of 1 mole of nonyl phenol with 9 moles of ethylene oxide. After the carbon tetrachloride has been completely removed by distillation, the aqueous slurry is filtered and the cake washed with hot water. The pigment cake is dried and ground to yield a product which incorporates easily into asphaltic and vinyl linoleum bases.

*Example 6*

A mixture containing 450 parts of anhydrous aluminum chloride, 110 parts of sodium chloride, 20 parts of cupric chloride and 60 parts of copper phthalocyanine is heated to 160° C. in a flask equipped for rapid agitation and having an air-cooled reflux condenser. Then 65 parts of bromine are introduced into the reaction mixture by bubbling chlorine gas through liquid bromine and directing the mixture of gases into the reaction flask. When all of the bromine has been added, the reaction mixture is heated to 200–210° C. and chlorine is added at 40 parts per hour for three more hours. A small sample of this reaction mass is drowned into 1000 parts of water containing 50 parts of sulfuric acid and the brom-chlor-containing copper phthalocyanine isolated by filtering, washing and drying. Analysis of the sample shows it to contain 19.3% bromine and 33.9% chlorine. The balance of the charge is poured slowly into 2000 parts of vigorously agitated water containing 25 parts of butyl benzyl phthalate. The drowned slurry is stirred for one hour and then filtered and washed free of acid and soluble salts. The resulting presscake is mixed with 340 parts of pigment grade calcium carbonate and dried at 120–130° C. The resulting dry powder is a reduced toner containing about 25% brom-chlor copper phthalocyanine. When compared to commercial phthalocyanine green lakes or reduced toners of similar composition it is very much yellower and distinctly brighter. This product is particularly suitable for coloring asphalt and vinyl floor tiles.

*Example 7*

The process of Example 1 is repeated except that the starting unhalogenated copper phthalocyanine is replaced with a brominated copper phthalocyanine containing about 8 bromine atoms per molecule and sufficient chlorine is introduced to produce the desired 15 to 16 halogen atom substitution. The resulting pigment is about 15% weaker than the product of Example 1 but is very much yellower in shade. This a desirable property for phthalocyanine greens.

*Example 8*

The process of Example 6 is repeated except that 50 parts of dioctyl phthalate is used instead of the 25 parts of butyl benzyl phthalate. The product has properties similar to the product of Example 6.

*Example 9*

For the preparation of asbestos-vinyl tile, the following ingredients are mixed together by hand in a stainless steel pot for about 5 minutes.

| Ingredient: | Parts |
| --- | --- |
| Titanium dioxide | 3.0 |
| Whiting calcite (calcium carbonate) | 12.5 |
| Copolymer of vinyl chloride and vinyl acetate | 22.0 |
| Dioctyl phthalate | 13.0 |
| Asbestos filler | 30.7 |
| Calcined clay | 14.5 |
| Normal lead salicylate (anti-oxidant) | 1.5 |
| Stabilizers | 2.6 |
| Calcium stearate (lubricant) | 0.2 |
| Coated pigment (product of Example 1) | 1.4 |

The mixture is then added to a 2-roll plastic mill, both rolls of which are heated to a temperature of 300° F. The mixture is milled and ground for a 5-minute cycle with a roll clearance of 0.015 in. followed by another 5-minute cycle at 0.035 in. After milling, the mixture is stripped from the mill in sheet form. A 6" x 6" portion of the sheet is placed between two polished chrome plates and press polished by subjection to a temperature of 350° F. and 4000 lbs. gauge pressure for 1½ minutes in a Carver laboratory press. The resulting vinyl tile has a uniform, strong, bright yellow green shade.

This invention has been disclosed with respect to certain preferred embodiments, and various modifications and variations thereof will become obvious to persons skilled in the art. It is to be understood that such modifications and variations are to be included within the spirit and scope of this invention. This application is a continuation-in-part of our application Serial No. 728,097, filed April 14, 1958, now abandoned.

We claim:

1. A process for conditioning polyhalogenated copper phthalocyanine pigment containing 12 to 16 halogen atoms per molecule comprising admixing the non-aqueous halogenation mass in which said pigment is produced with an aqueous medium in the presence of at least 5% and up to about 200%, based on the weight of said pigment, of a water-immiscible monomeric organic ester of a poly basic acid, said ester having a boiling point of at least about 150° C., and then separating the pigment particles coated with said organic ester from the aqueous phase.

2. A process as defined in claim 1 in which said organic ester is butyl benzyl phthalate.

3. A process as defined in claim 1 in which said organic ester is dimethyl phthalate.

4. A process as defined in claim 1 in which said organic ester is dioctyl phthalate.

5. A process as defined in claim 1 in which said organic ester is dicapryl phthalate.

6. A process as defined in claim 1 in which said organic ester is dibutyl phthalate.

7. A process as defined in claim 1 in which the polyhalogenated copper phthalocyanine contains 12 to 16 chlorine atoms.

8. A process as defined in claim 1 in which the polyhalogenated copper phthalocyanine contains at least one and up to 12 bromine atoms and the remainder chlorine atoms.

9. A process for conditioning polychlorinated copper phthalocyanine pigment containing 12 to 16 halogen atoms per molecule and produced by halogenating the copper phthalocyanine in a fused eutectic mixture of aluminum chloride and sodium chloride comprising drowning the halogenation mass in which said pigment is produced in an aqueous medium in the presence of at least about 5% and up to about 200%, based on the weight of said pigment, of a water-immiscible monomeric organic ester of a poly-basic acid, said ester having a boiling point of at least about 150° C., and then separating the pigment particles coated with said organic ester from the aqueous phase.

10. A process as defined in claim 9 in which said organic ester is butyl benzyl phthalate.

11. A process as defined in claim 9 in which said organic ester is dimethyl phthalate.

12. A process as defined in claim 9 in which said organic ester is dioctyl phthalate.

13. A process as defined in claim 9 in which said organic ester is dicapryl phthalate.

14. A process as defined in claim 9 in which said organic ester is dibutyl phthalate.

15. A process as defined in claim 9 in which the polyhalogenated copper phthalocyanine contains 12 to 16 chlorine atoms.

16. A process as defined in claim 9 in which the polyhalogenated copper phthalocyanine contains at least one and up to 12 bromine atoms and the remainder chlorine atoms.

17. A process for conditioning polyhalogenated copper phthalocyanine pigment containing 12 to 16 halogen atoms per molecule and produced by halogenating the copper phthalocyanine in a fused eutectic mixture of aluminum chloride and sodium chloride comprising drowning the halogenation mass in which said pigment is produced in an aqueous medium containing emulsified therein at least about 5% and up to about 200%, based on the weight of said pigment, of a water-immiscible monomeric organic ester of a polybasic acid, said ester having a boiling point of about 150° C., and then separating the pigment particles coated with said organic ester from the aqueous phase.

18. A process as defined in claim 17 in which said organic ester is butyl benzyl phthalate.

19. A process as defined in claim 17 in which said organic ester is dimethyl phthalate.

20. A process as defined in claim 17 in which said organic ester is dioctyl phthalate.

21. A process as defined in claim 17 in which said organic ester is dicapryl phthalate.

22. A process as defined in claim 17 in which said organic ester is dibutyl phthalate.

23. A process as defined in claim 17 in which the polyhalogenated copper phthalocyanine contains 12 to 16 chlorine atoms.

24. A process as defined in claim 17 in which the polyhalogataed copper phthalocyanine contains at least one and up to 12 bromine atoms and the remainder chlorine atoms.

References Cited in the file of this patent

UNITED STATES PATENTS

| | | |
|---|---|---|
| 2,153,515 | Denslow et al. | Apr. 4, 1939 |
| 2,192,954 | Sloan et al. | Mar. 12, 1940 |

FOREIGN PATENTS

| | | |
|---|---|---|
| 499,790 | Great Britain | Jan. 30, 1939 |
| 631,139 | Great Britain | Oct. 27, 1949 |